United States Patent [19]

Rusche

[11] Patent Number: 4,767,122

[45] Date of Patent: Aug. 30, 1988

[54] THREE-DIMENSIONAL THERMAL TARGET SIMULATOR AND METHOD OF MAKING SAME

[75] Inventor: Gerald A. Rusche, Fairfax City, Va. 22030

[73] Assignee: The United States of America as represented by the Secretary of the Army, Washington, D.C.

[21] Appl. No.: 101,308

[22] Filed: Sep. 25, 1987

[51] Int. Cl.$^4$ .............................................. F41J 1/00
[52] U.S. Cl. .................................. 273/348.1; 434/16
[58] Field of Search ...................... 434/16; 273/348.1

[56] References Cited

U.S. PATENT DOCUMENTS

| 4,240,212 | 12/1980 | Marshall et al. | 273/348.1 |
| 4,346,901 | 8/1982 | Booth | 273/348.1 |
| 4,405,132 | 9/1983 | Thalmann | 273/348.1 |

FOREIGN PATENT DOCUMENTS

| 2148532 | 5/1985 | United Kingdom | 273/348.1 |

Primary Examiner—Leo P. Picard
Attorney, Agent, or Firm—Max L. Harwell; John E. Holford; Anthony T. Lane

[57] ABSTRACT

Orthogonal thermographs of a target one desires to simulate are taken, are reproduced on a plastic medium, and are formed onto a model of the target. The model is the same scale as the thermographs, and is transparent to radiation from internal sources. These sources are baffled, visible-light sources and correspond to the thermally-emissive portions of the target. The thermographs are covered by a paint or filter material which passes only a preselected portion of the source spectrums. A visible-light television camera without a filter which passes this portion will thus yield a signal which will appear as an infrared image on a television monitor. At the same time, another visible-light television camera with a filter will yield a signal for a visible-light target simulation, when the model is illuminated from outside with visible light.

6 Claims, 2 Drawing Sheets

THREE-DIMENSIONAL THERMAL TARGET SIMULATOR AND METHOD OF MAKING SAME

The invention described herein may be manufactured, used, and licensed by the U.S. Government for governmental purposes without the payment of any royalties thereon.

BACKGROUND OF THE INVENTION

The present invention is in the field of thermal (infrared) target simulators. In order to train operators in the use of thermal target viewers, either real or simulated targets which one might encounter when using such a viewer must be provided. In the case of a tank or some other large target, it may be impractical to use the real thing. Various schemes have been proposed to date which simulate targets to more or less degrees. One interesting scheme is that shown by Vincent T. Bly in U.S. Pat. No. 4,178,514 of Dec. 11, 1979, wherein a visible image is converted into an infrared image by what Bly called a "visible to infrared transducer," but which is now known in the art as a "Bly cell." The infrared image thus obtained may be used to test infrared detectors, etc. Another scheme employs a mock-up of a target with heat sources therein to simulate target heat sources such as engines; U.S. Pat. No. 4,253,670 of Mar. 3, 1981 by Moulton et al shows this scheme.

Unfortunately, these prior art schemes suffer from the disadvantage that they are essentially two-dimensional simulations, i.e. one cannot look at the simulations from various aspects with a thermal viewer as one might be expected to do with a real target. Moreover, they cannot account for changes in the thermal signatures of targets for various conditions. In the case of a tank, its thermal signature depends upon such things as whether it has been moving recently (with subsequent heating of its drive sprockets, shock absorbers, bogie or road wheels, and tracks), whether its cannon or machine guns have recently fired, whether and how long its engine has been running, and whether or not its personnel heater is or has been recently in use. Further, the simulators thus far described use infrared sources or images to produce a simulated infrared target for an infrared viewer. In many instances, because of cost or availability, it is desirable to simulate an infrared image not on an infrared viewer, but by some other means. A television monitor is a good device for this, if one can generate a simulated infrared image for display on such a monitor. A method and apparatus for so doing is what this invention is concerned with. The invention as described herein provides a variable signature three-dimensional target simulation and thus overcomes the prior art disadvantages.

SUMMARY OF THE INVENTION

The invention is a thermal or visible target simulator and the method of making such a simulator. The simulator consists of a plurality of visible emitters enclosed in a housing transparent to the emission. The housing is a model of the target which one wishes to simulate, with thermographs of the actual target formed onto the model. The simulator is made by making thermographs of the target, reproducing these thermographs on a translucent plastic medium, and forming the thermographs thus reproduced onto the target model. The outer surfaces of the thermographs are then covered with a paint or filter material transparent to one wavelength or band of wavelengths of the visible emitters. Various portions of a target normally have different thermal characteristics, and an emitter is provided corresponding to each such portion. The various emitters are baffled and adjusted in intensity in accordance with the target signature desired. The simulator is viewed by a naked eye or visible-light light television camera and displayed on a television monitor.

DETAILED DESCRIPTION OF THE INVENTION

In order to practice the invention, a model of the target is made and orthogonal thermographs of the tank are glued or vacuum formed onto respective sides of the model. Visible and baffled radiation sources are placed inside the model. Finally, the simulator is completed by covering the outside surfaces of the thermographs with a paint which does two things. The paint is transparent to a particular wavelength or band of wavelengths of the visible radiation sources and only transmits this wavelength or band of wavelengths. At the same time, the paint reflects visible light directed onto it from outside the simulator such that it appears as a visible target simulation to a visible light television camera equipped with a filter to block the particular wavelength or band of wavelength. Without this filter, and with the emitters energized, the simulation looks like an infrared target to the television camera. Obviously, two television cameras may be used at the same time, one with a filter, and one without. The camera without the filter will provide a signal to a television monitor which simulates an infrared target, whereas the one with the filter will provide a signal which will show an apparent visible light target. It should be understood that the thermographs will have varying optical densities or transmissivities in order that the simulator will appear as a thermal target to a visible-light viewer. The invention thus provides a cheap and simple means whereby operators may be trained to recognize thermal targets with various signatures, and the correspond visible-light targets.

Figure 1:
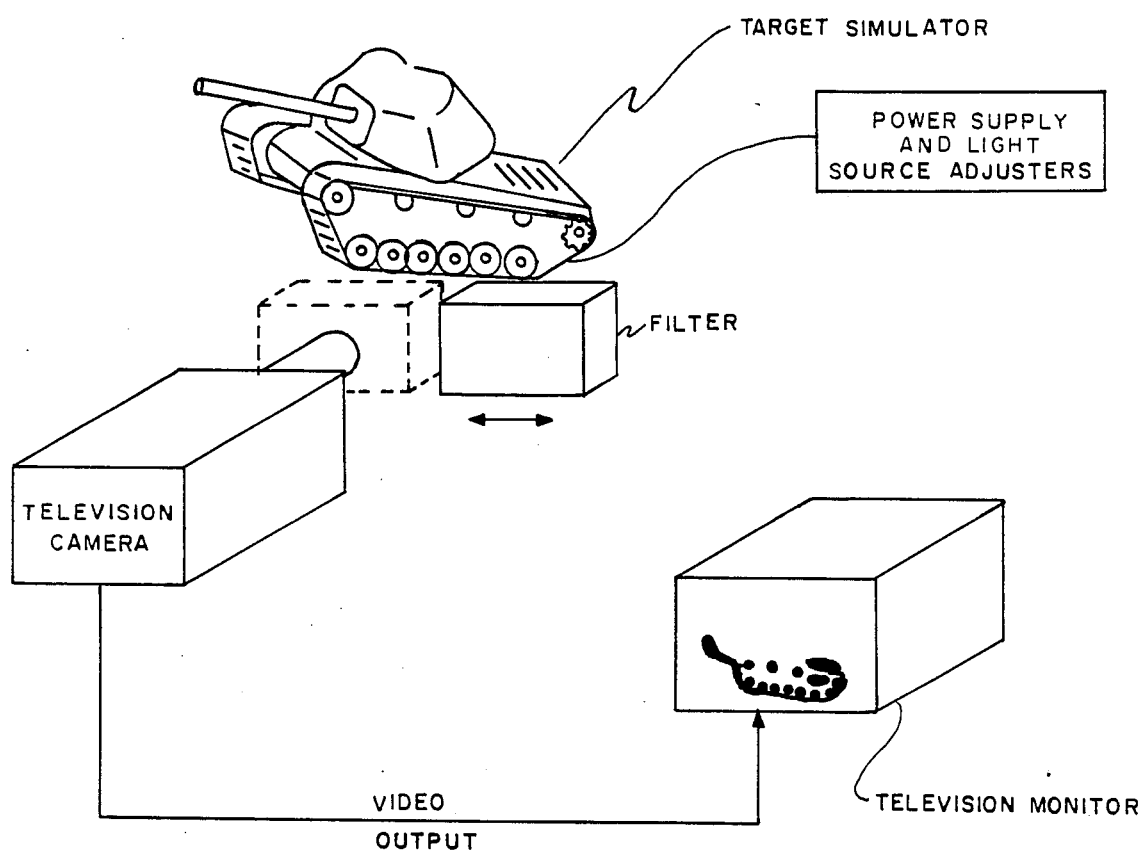
FIG. 1 is a schematic showing of the inventive system.

Referring now to the drawings, we see in FIG. 1 the system of the invention. A simulator of a tank made in accordance with the invention is viewed by a conventional television camera, with the video output of the camera fed to a television monitor. A filter interposable between the camera and the simulator allows the model to be viewed as an infrared simulated target, or a visible target, as explained above. The picture on the television monitor is a simulated infrared image of a tank whose engine has been running and which has been moving about, with subsequent heating of its tracks and various wheels, as well as its engine, although the simulator itself is shown for incident visible light.

Figure 2:
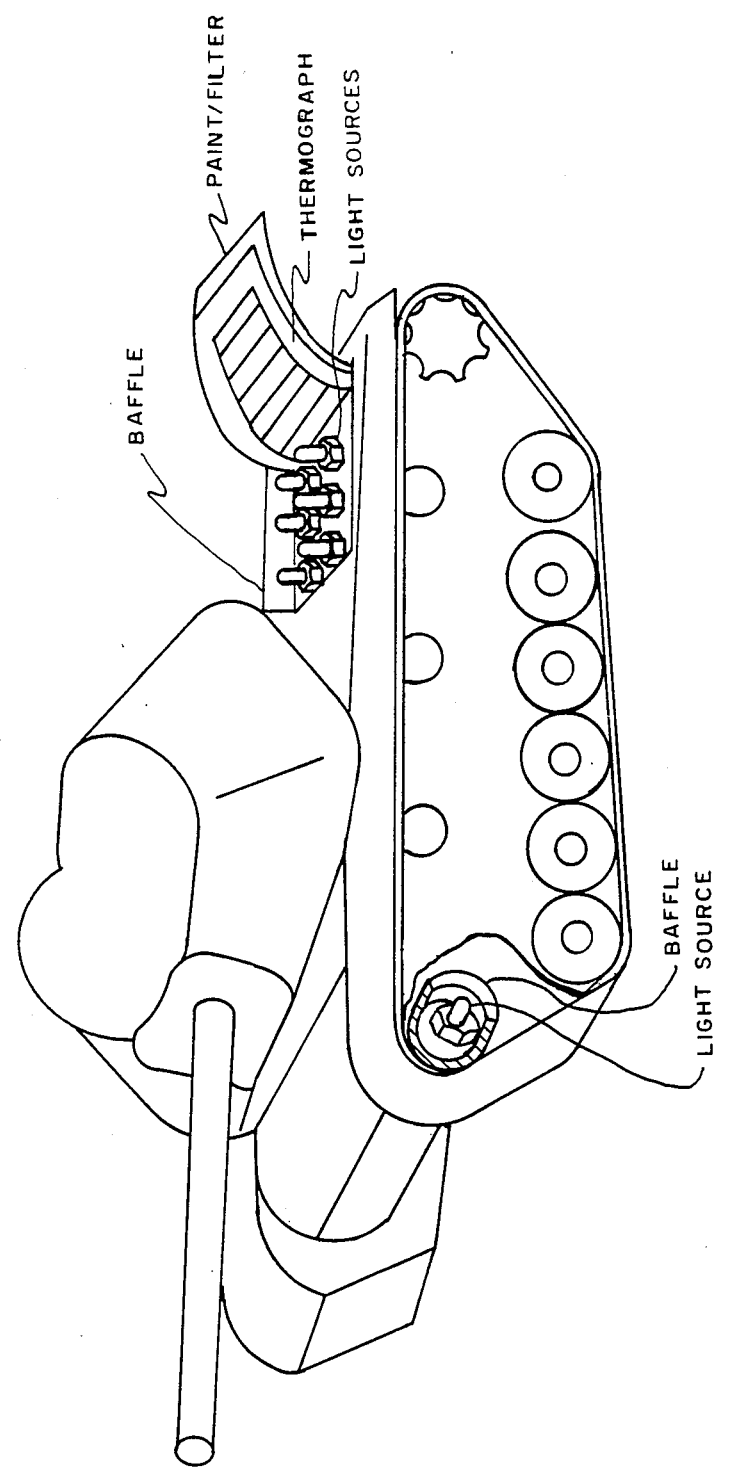
FIG. 2 is a pictoral view, partly cut away, of a target simulator made in accordance with the invention.

FIG. 2 shows an enlarged view of the simulator, with one portion cut away and another peeled back to show light sources (incandescent bulbs) and their baffles. These sources are used to simulate the infrared-emitting idler sprocket of the tank's track, and the engine. Obviously, other types of light sources than incandescent bulbs may be used. For example, colored light-emitting diodes may be used, in which case it may be possible to omit the paint on the thermographs of the model. On the right side of FIG. 2, the covering of the model is peeled back to show a portion of the thermograph covering the top of the model, and the paint/filter layer on the thermograph. The word "simulator" as used herein is intended to indicate the final product, i.e. the model covered with thermographs and with the thermographs covered by a paint/filter layer. Although the target simulator as been described as usable with a visible-light television camera, if incandescent bulbs are used, the simulator will be usable as an infrared simulated target with infared viewers.

I claim:

1. A thermal target simulator system including:
   a thermal or visible simulator of said target including:
   a scale model of said target;
   thermographs of said target affixed to said model and having some regions opaque to visible light and other translucent thereto in correspondence to thermally emissive portions of said target;
   a plurality of visible light sources in said model corresponding to said thermally emissive portions of said target and selectively variable in intensity, and wherein each source is placed with respect to said thermographs and baffled in accordance with the radiation pattern of the thermally emissive portion to which it corresponds;
   a first filter material covering said thermographs and which transmits only a predetermined wavelength or band of wavelengths of said sources,
   a visible-light television camera for observing said simulator and providing an output video signal;
   a television receiver for receiving said signal and displaying a visible image of said target;
   a second filter material interposable between said camera and said simulator and which is essentially opaque to said predetermined wavelength or band of wavelengths of said sources, whereby said simulator may be viewed as a simulated thermal target by said television camera in the absence of said second filter material, and by ambient light as a visible-light simulated target when said second filter material is interposed between said camera and said simulator.

2. The system as set forth in claim 1 wherein said sources are incandescent.

3. A thermal or visible target simulator including:
   a scale model of said target;
   thermographs of said target affixed to said model and having some regions opaque to visible light and others translucent thereto in correspondence to thermally emissive portions of said target;
   a plurality of visible light sources in said model corresponding to said thermally emissive portions of said target and selectively variable in intensity, and wherein each source is placed with respect to said thermographs and in baffled in accordance with the radiation pattern of the thermally emissive portion to which it corresponds;
   a filter material covering said thermographs and which transmits only a predetermined wavelengths or band of wavelengths of said sources, whereby said model may be view as a simulated thermal target by a visible light television camera responsive in a visible light band encompassing said predetermined wavelength or band of wavelengths, or as a visible target in ambient visible light with the interposition between the television camera and the target simulator of a filter opaque to said wavelength or band of wavelengths and transparent to other visible light wavelengths.

4. The simulator as set forth in claim 3 wherein said sources are incandescent.

5. A method of making a thermal or visible simulator of a target, including the steps of:
   making thermographs of said target;
   reproducing said thermographs on a plastic medium;
   preparing a model of said target, to the same scale as said reproduced thermographs;
   inserting a plurality of intensity-adjustable visible-light sources into said model, wherein each source corresponds to a thermally emissive portion of said target and is baffled to correspond to the emissive pattern of said portion;
   forming said reproduced thermographs onto corresponding parts of said model
   and covering said thermographs with a material transparent to a wavelength or band of wavelengths of said sources and opaque to other wavelengths.

6. The method as set forth in claim 5 wherein said thermographs are obtained by making orthogonal thermographs of said target.

* * * * *